United States Patent [19]

Russell

[11] 4,408,979
[45] * Oct. 11, 1983

[54] APPARATUS FOR STRETCHING OF FASTENERS

[75] Inventor: David B. Russell, Southborough, Mass.

[73] Assignee: Dennison Manufacturing Company, Framingham, Mass.

[*] Notice: The portion of the term of this patent subsequent to Jun. 30, 1998 has been disclaimed.

[21] Appl. No.: 190,138

[22] Filed: Sep. 24, 1980

Related U.S. Application Data

[60] Continuation of Ser. No. 941,083, Sep. 11, 1978, Pat. No. 4,276,255, which is a division of Ser. No. 721,774, Sep. 9, 1976, abandoned.

[51] Int. Cl.$^3$ ............................................... B29C 17/02
[52] U.S. Cl. ...................................... 425/383; 28/244
[58] Field of Search .......................... 28/240, 244, 245; 425/445, 383, DIG. 17, 53, 236

[56] References Cited

U.S. PATENT DOCUMENTS

| 550,394 | 11/1895 | Mackinney | 26/90 |
| 2,974,392 | 3/1961 | Timbie | 28/245 |
| 2,988,772 | 6/1961 | Horn | 26/88 |
| 3,254,148 | 5/1966 | Nichols | 264/290.2 |
| 3,380,122 | 4/1968 | Kirk | 264/336 |
| 3,457,589 | 7/1969 | Gordon | 425/392 |
| 3,466,359 | 9/1969 | Van Burleigh et al. | 264/103 |
| 3,807,004 | 4/1974 | Andersen | 264/290.2 |
| 3,875,648 | 4/1975 | Bone | 264/291 |
| 4,143,113 | 3/1979 | Suzuki | 264/291 |

Primary Examiner—James B. Lowe
Attorney, Agent, or Firm—George E. Kersey; Arthur B. Moore; Barry D. Josephs

[57] ABSTRACT

Method and apparatus for stretching of fastener stock. The stock is of stretchable material and is engaged by members which are spaced apart at an angle and rotate at substantially the same peripheral speed in different planes to stretch the portion of the stock that extends between the members.

10 Claims, 9 Drawing Figures

APPARATUS FOR STRETCHING OF FASTENERS

BACKGROUND OF THE INVENTION

This application is a continuation of Ser. No. 941,083 filed Sept. 11, 1978 now U.S. Pat. No. 4,276,255 issued June 30, 1981, which is a division of Ser. No. 721,774, filed Sept 9, 1976, now abandoned.

The invention relates to a method and apparatus for the stretching of flexible devices that are used to join objects together. Such devices, which are commonly known as "fasteners" have gained wide industrial and commercial acceptance. As shown, for example, in U.S. Pat. No. 3,875,648, the fasteners can be formed by a thin flexible filament, typically of plastic with an enlarged head at each end. Such fasteners are used to attach buttons to garments, tags to merchandise, in matching pairs of shoes and socks, and generally for the temporary or permanent joinder of items.

The fasteners typically are provided in an assemblage, and individual fasteners are secured, as needed, from the assemblage. There are two basic types of fastener assemblage. In the first type, as disclosed in U.S. Pat. Nos. 3,103,666; 3,380,122; and 3,399,432, the individual fasteners have filaments that extend to cross bars which are in turn joined to a support rod by severable necks. The filaments of the fasteners are stretched to decrease their diameters and to strengthen their joinder to the cross bars. The filaments can be stretched within the mold by which the fasteners are formed, as illustrated in U.S. Pat. No. 3,380,122, or they can be stretched independently of the mold as illustrated by U.S. Pat. No. 3,457,589. The resulting fasteners can be applied by the dispensers illustrated in U.S. Pat. Nos. 3,103,666; 3,470,834; 3,759,435; and 3,875,648.

In the second type of assemblage, as shown in U.S. Pat. No. 3,875,648, two opposed longitudinally extending side members are joined together by regularly spaced and transversely extending filaments. Individual fasteners are severed from the side members between adjoining filaments. The latter are desirably stretched either in the mold in which they are formed, or outside the mold.

The foregoing procedures and apparatus for the stretching of fasteners are relatively slow and expensive.

Accordingly, it is an object of the invention to expedite the formation of fasteners for the attachment of items. A related object is to expedite the formation of assemblages of attachments.

A further object of the invention is to facilitate the stretching of fasteners. A related object is to facilitate the stretching of assemblages of attachments.

Other objects of the invention will become apparent from the description of the invention set forth below.

SUMMARY OF THE INVENTION

In accordance with the invention fasteners are stretched by being engaged by members which are spaced apart and rotate in non-parallel planes. In accordance with one aspect of the invention the engagement members rotate and the fasteners are integrally formed from stock with opposed side rails with cross links.

The engagement members, which are desirably in the form of wheels, have a minimum peripheral separation which is no greater than the portion of each fastener that is to be stretched, and diverge at least to a maximum peripheral separation corresponding to the portion after stretching.

Each engagement wheel preferably has a plurality of radial projections spaced apart at the cross link intervals. In addition the mounting of the wheels is desirably made adjustable to vary the angle of divergence and thus the amount of stretching imparted to each cross link.

In operation the fastener stock is fed continuously into engagement with the rotating engagement wheels. The cross links of the stock are then stretched by the diverging wheels and the stretched stock is thereafter removed by continuing the rotation of the wheels, which converge and thus release the tension of the stretched fasteners.

DESCRIPTION OF THE DRAWINGS

Other aspects of the invention will become apparent after considering several embodiments of the invention taken in conjunction with the drawings in which.

DETAILED DESCRIPTION

Figure 1:
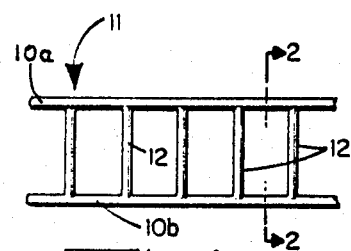
FIG. 1 is a view of unstretched fastener stock in accordance with U.S. Pat. No. 3,875,648.
Figure 2:
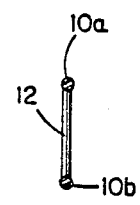
FIG. 2 is a sectional view along lines 2—2 of FIG. 1.

As shown in FIGS. 1 and 2 the fastener stock 11 is formed by longitudinally extending side members 10a and 10b which are joined together at regular intervals by a succession of unstretched, transversely extending cross connectors 12.

The fastener stock 11 can be made in any suitable fashion, for example, by injection molding, extrusion, butt welding, and as described in U.S. Pat. No. 3,875,648. The fastener stock typically is a unitized plastic structure manufactured, for example, of nylon, polyethylene, polypropylene, polyurethane, or other similar material.

Figure 3:
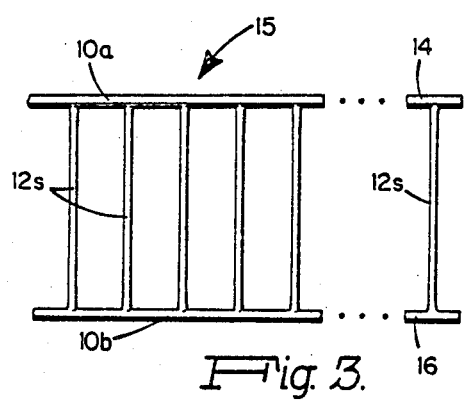
FIG. 3 is a view of the stock of FIG. 1 after the stretching in accordance with the invention.

After being stretched in accordance with the invention, the stock 11 of FIG. 1 has a configuration similar to that of the stock 15 in FIG. 3, with each cross connector 12s stretched into a filament by an amount which typically is two to five times the original unstretched length of the cross connector 12 in FIG. 1. The only limitation on the stretching is that it not exceed the tensile limit of the material. Individual fasteners are provided from the stretched stock 15 by severing the side members 10a and 10b between adjoining filaments 12s to provide a fastener with cross bars 14 and 16 on the opposite ends of a filament 12s.

Figure 4:
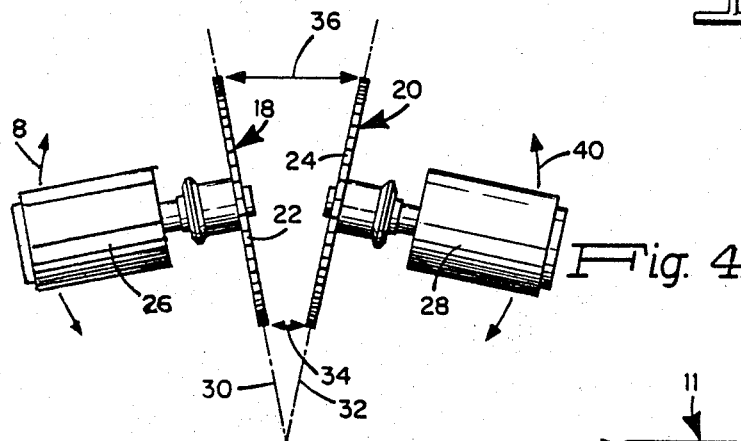
FIG. 4 is a view of stretching apparatus in accordance with the invention.

Referring to FIG. 4, an apparatus for stretching the stock 11 in accordance with the invention is formed by a pair of rotatable wheels 18 and 20 with projections 22 and 24 spaced around their peripheries for engaging side members 10a and 10b between successive cross connectors of the stock at intervals substantially equal to their distances of separation. The wheels 18 and 20 are rotated by synchronous motors 26 and 28 at substantially the same speed, and are angularly mounted with respect to one another such that extensions 30 and 32 of their planes of rotation converge in an acute angle. As a result, the wheels have a position of maximum convergency 34 and a position of maximum divergence 36 at an angular displacement of 180°.

The motors 26 and 28 are pivotally mounted to permit variation of the angle between the wheels as indicated by the arrows 38 and 40. This can be accomplished by using clamping bolts in an arcuate track (not shown). A change in the angle between the wheels 18 and 20 and the accompanying variation in the divergence 36, permits different lengths of stretched filaments to be made from a single length cross bar.

Figure 5:
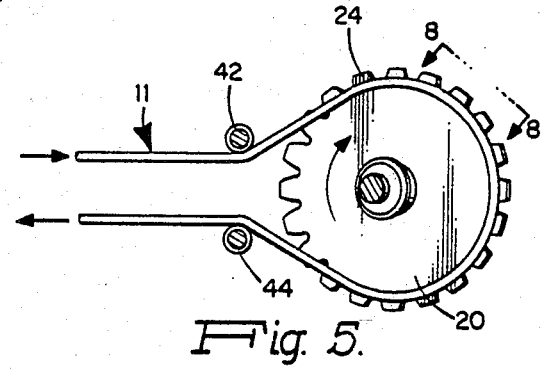
FIG. 5 is a side view of the apparatus of FIG. 4 showing the stretching of fastener stock.
Figure 6:
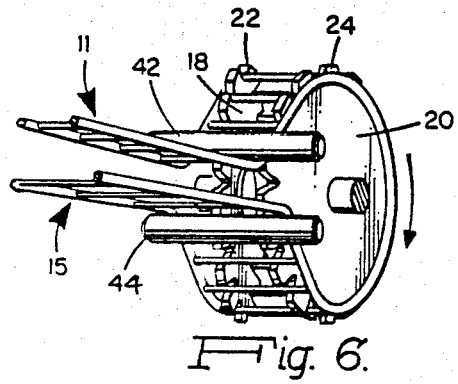
FIG. 6 is a perspective view of the rearward engagement portion of the apparatus of FIG. 4.
Figure 7:
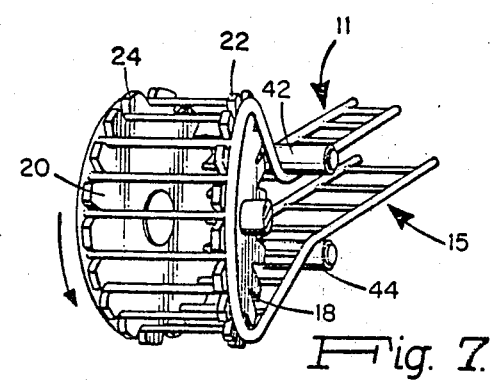
FIG. 7 is a perspective view of the diverging frontal portion of the apparatus of FIG. 4.
Figure 8:
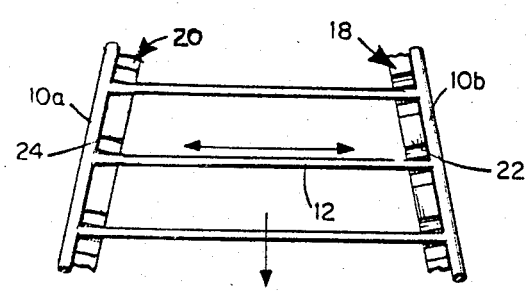
FIG. 8 is an enlargement of a portion of FIG. 5 illustrating the stretching of fastener stock in accordance with the invention.

As indicated in FIG. 5 the unstretched fastener stock 11 is fed mechanically or manually under a feed bar 42 and over projections of the two wheels, such as the projections 24 of the wheel 20, at a point where the wheels converge with a distance between them no greater than the length of the unstretched cross connector 12. Opposed pairs of projections, such as the projections 22 and 24 as shown in FIG. 6 engage side members 10a and 10b adjacent opposite ends of each cross connector to advance and simultaneously stretch the connectors as the wheels diverge, the cross connectors fitting into notches defined between adjacent projections. Stretching continues until the wheels 18 and 20 reach their position of maximum divergence 36, after which, as indicated in FIG. 7, pairs of projections converge and release the stretched filaments. The stretched stock is then removed at a bar 44, as illustrated in FIGS. 6 and 7.

The only condition imposed on the wheels 18 and 20 is that they lie in converging planes. The point of maximum convergency 34 of the wheels 18 and 20 is illustratively less than the length of any unstretched cross connector 12, and the point of maximum divergency 36 is equal to the length of the stretched filament. If desired, however, the gap 34 may equal the length of the unstretched connector and the maximum divergency 36 may be somewhat greater than the desired length of the stretched filament, especially where the plastic material possesses resilience. It has been found, for example, that the stretching of fastener stock in accordance with the invention is beneficial even where the material stock is so resilient that it returns to nearly its original length after stretching.

While the unstretched fastener stock 11 is shown being fed onto the projections at the peripheries of the wheels near the position 34 of maximum convergence, the stock may be fed at any other position where the wheels are spaced apart a distance no greater than the length of the unstretched cross connectors 12. Similarly, it is preferred that the stretched stock be advanced beyond the position of maximum stretching 36 to facilitate removal. However, the stretched stock may be forcibly withdrawn at an earlier position, particularly if the maximum divergence 36 exceeds the desired stretched length of the fastener.

Fixed peripheral projections are preferred and shown for retaining the fastener stock on the engagement wheels. Any other suitable retainer, however, may be employed. For example, the peripheries of wheels 18, 20 may be grooved to receive end members 10a and 10b with clamps that retain the end members in the grooves during stretching.

Figure 9:
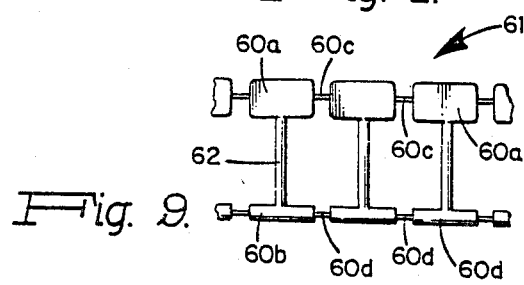
FIG. 9 is a view of alternative stock for stretching in accordance with the invention.

It will also be appreciated that the stock 11 of FIG. 1 is merely illustrative and that alternative types of stock may be employed. One such example is the stock 61 of FIG. 9 in which the rail 10a of FIG. 1 is substituted by successive heads 60a which are joined by thin webs 60c and the rail 10b is substituted by cross bars 60b joined by thin webs 60d. Each head is joined to a cross bar by a cross connector 62. Another example is a modification of the stock 61 in which the webs 60c or 60d are omitted and the successive heads 60a, and successive cross bars 60b, are integrally joined.

The foregoing description is for the purpose of illustration and the invention includes all modifications and equivalents within the scope of the appended claims.

I claim:

1. Apparatus for stretching fastener stock formed by at least one group of longitudinally joined side members that are coupled at predetermined intervals by transversely extending and stretchable connectors comprising, means for divergingly engaging the fastener stock at spaced-apart positions of the connectors to stretch them into flexible filaments; and means for maintaining said fastener stock in contact with the divergingly engaging means beyond said spaced-apart positions.

2. Apparatus as defined in claim 1 wherein the engaging means comprises a pair of members mounted for rotation at substantially the same peripheral speed in different planes which define an acute angle when extended.

3. Apparatus as defined in claim 1 wherein the members are wheels which are spaced apart to define an angled gap between them, with a first portion of the gap being no greater in width than the length of the unstretched connectors and a second portion of the gap being at least as great as the length of the stretched filaments.

4. Apparatus as defined in claim 1 further including means for removing successive increments of stretched fastener stock from said engaging means after a prescribed rotation of said engaging means.

5. Apparatus as defined in claim 4 further including means for removing successive increments of stretched fastener stock from said engaging means after a prescribed rotation of said engaging means.

6. Apparatus as defined in claim 1 wherein the engaging means are adjustable to vary the divergency thereof and thereby provide for the stretching of different lengths of said connectors.

7. Apparatus as defined in claim 1 wherein the longitudinally joined side members are continuously extending.

8. Apparatus as defined in claim 1 wherein at least one of the longitudinally joined side members is in the form of individual pieces that are joined to one another by thinner webs.

9. Apparatus for stretching fastener stock formed by at least one group of longitudinally joined side members that are coupled at predetermined intervals by transversely extending and stretchable connectors comprising means having notches for engaging said connectors and side surfaces for engaging said longitudinally joined side members over an arc of a circle;

means for causing the engaging means to diverge and stretch said connectors into flexible filaments; and means for removing the stretched stock from the engaging means.

10. Apparatus for stretching the filaments of plastic fastener stock, said stock comprising two opposed, longitudinally extending side members joined together along their lengths by transversely-extending filaments, the filaments being spaced apart along the side members at a substantially constant interval, said apparatus comprising:
(a) a pair of wheels each of which has a plurality of upstanding projections about its periphery, the leading edges of the projections on each wheel being spaced apart, at said constant interval;
(b) means for mounting said wheels to rotate at substantially the same peripheral speed but in different planes, the planes and extensions thereof converging to define an acute angle, the wheels being spaced apart to define an angled gap therebetween, the wheels most closely converging and diverging from each other at points 180° apart about the periphery of the wheels, the wheels diverging to a distance at least equal to the desired length of the stretched filament and converging to a distance less than the unstretched length of the filaments;
(c) means for feeding successive filaments of fastener stock into driving engagement with successive opposed pairs of said projections at a peripheral position where said wheels are converged to a distance less than the length of the unstretched filaments; and,
(d) means for removing stretched fastener stock from the wheels beyond their maximum separation positions.

* * * * *